(12) United States Patent
Miller et al.

(10) Patent No.: US 12,552,250 B2
(45) Date of Patent: Feb. 17, 2026

(54) CONTEXT-BASED MAPPING FOR PHYSICAL VEHICLE CONTROLS

(71) Applicant: Rivian IP Holdings, LLC, Irvine, CA (US)

(72) Inventors: Matthew Royce Miller, San Francisco, CA (US); Kok Wei Koh, Mountain View, CA (US); Michael Kevin Moore, Menlo Park, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 15 days.

(21) Appl. No.: 18/796,199

(22) Filed: Aug. 6, 2024

(65) Prior Publication Data

US 2025/0058627 A1 Feb. 20, 2025

Related U.S. Application Data

(60) Provisional application No. 63/519,553, filed on Aug. 14, 2023.

(51) Int. Cl.
*B60K 35/10* (2024.01)
*B60G 17/017* (2006.01)
*B60K 35/22* (2024.01)
*B60R 1/072* (2006.01)

(52) U.S. Cl.
CPC ............ *B60K 35/10* (2024.01); *B60G 17/017* (2013.01); *B60K 35/22* (2024.01); *B60R 1/072* (2013.01); *B60K 2360/126* (2024.01); *B60K 2360/128* (2024.01); *B60K 2360/782* (2024.01)

(58) Field of Classification Search
CPC .. B60K 35/10; B60K 35/22; B60K 2360/126; B60K 2360/128; B60K 2360/782; B60K 35/28; B60K 35/29; B60K 35/80; B60K 35/60; B60K 35/85; B60K 2360/1438; B60G 17/017; B60R 1/072; B60R 16/005; B60R 16/023
See application file for complete search history.

(56) References Cited

U.S. PATENT DOCUMENTS

2022/0266647 A1* 8/2022 Brzeski ............. B60G 17/0164
2024/0133744 A1* 4/2024 Huang ................. G01K 1/026

* cited by examiner

*Primary Examiner* — Xiao En Mo
(74) *Attorney, Agent, or Firm* — Patterson + Sheridan, LLP (57) ABSTRACT

A system for associates functions with physical controls (e.g., buttons and/or a scroll wheel) of a vehicle based on a trigger. The vehicle includes a plurality of vehicle systems. One or more physical controls are mounted within the vehicle and configured to be manipulated by a user of the vehicle. An in-vehicle control system is coupled to the plurality of vehicle systems. The in-vehicle control system is configured to: detect a state of one or more of the plurality of vehicle systems; determine that a trigger for a context mapping is met by the state; and in response to determining that the trigger for the context mapping is met by the state associating functions defined for the one or more physical controls by the context mapping with the one or more physical controls.

20 Claims, 12 Drawing Sheets

CONTEXT-BASED MAPPING FOR PHYSICAL VEHICLE CONTROLS

CROSS-REFERENCE TO RELATED APPLICATIONS

This application claims priority to and benefit of U.S. Provisional Patent Application No. 63/519,553, filed Aug. 14, 2023, which is assigned to the assignee hereof and hereby expressly incorporated herein in its entirety as if fully set forth below and for all applicable purposes.

INTRODUCTION

The present disclosure relates to vehicle controls and, more particularly, to physical vehicle controls that are physically manipulated by a user.

SUMMARY

The present disclosure describes a system for associating functions with physical controls (e.g., buttons and/or a scroll wheel) of a vehicle based on a trigger. In one aspect, a vehicle includes a plurality of vehicle systems. One or more physical controls are mounted within the vehicle and configured to be manipulated by a user of the vehicle. An in-vehicle control system is coupled to the plurality of vehicle systems. The in-vehicle control system configured to: detect a state of one or more of the plurality of vehicle systems; determine that a trigger for a context mapping is met by the state; and in response to determining that the trigger for the context mapping is met by the state, associating functions defined for the one or more physical controls by the context mapping with the one or more physical controls.

DETAILED DESCRIPTION

Figure 1:
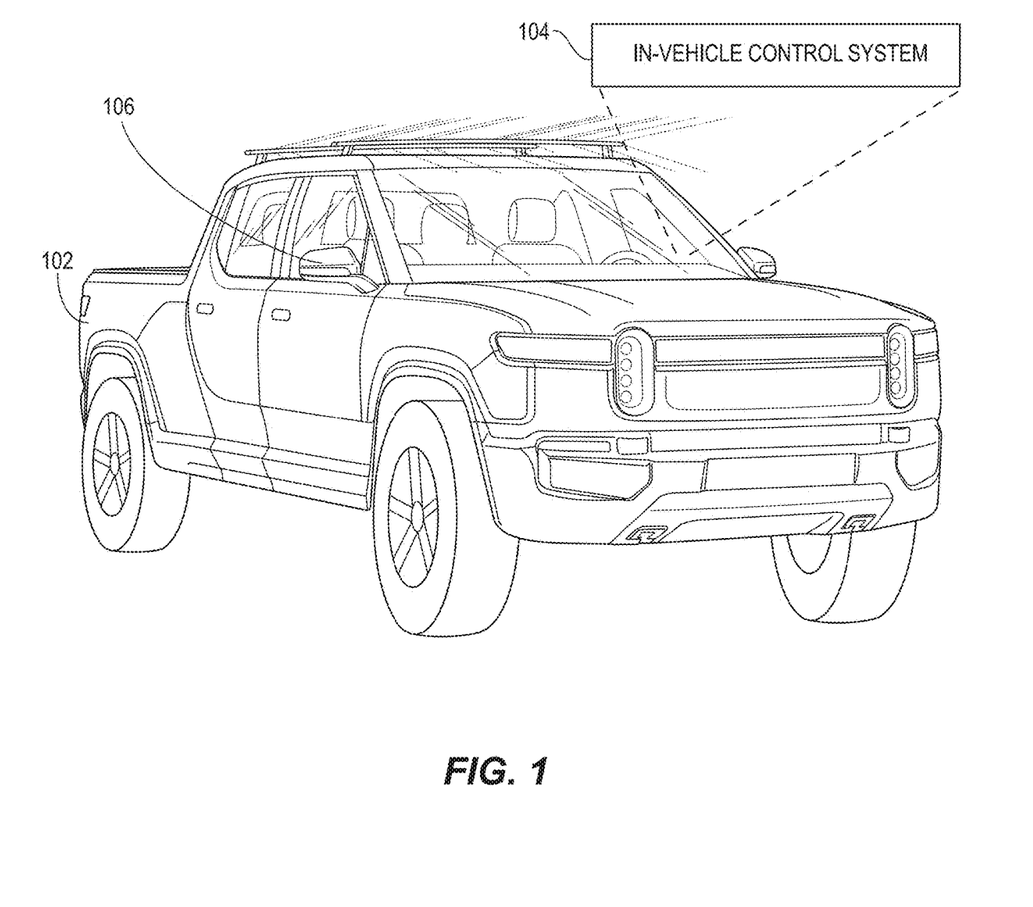
FIG. 1 illustrates an example vehicle.

FIG. 1 illustrates an example vehicle 102 having an in-vehicle control system 104. Unless otherwise indicated, the functions and methods described herein may be performed by the in-vehicle control system 104. The in-vehicle control system 104 may be embodied as a general-purpose computing device (e.g., computing device executing a mobile operating system, such as ANDROID) or other programmable logic device.

As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may utilized for transportation and to navigate one or more rural environments, urban environments, and/or off-roading and mountainous environments. In one embodiment, the vehicle 102 may include a gasoline-powered vehicle that may be propelled, for example, by an internal combustion engine (ICE) or other fuel-injection engine.

In certain embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In some embodiments, the vehicle 102 may include an autonomous or semi-autonomous vehicle suitable for operating, for example, in accordance with Level-3 autonomous driving, Level-4 autonomous driving, Level-5 autonomous driving, or switching between the different levels of autonomous driving functionality. Further, while the present embodiments may be discussed primarily with respect to the example embodiment of a personal passenger vehicle 102, it should be appreciated that, in other embodiments, the vehicle 102 may be one of a fleet of similar vehicles 102 (e.g., a fleet of cargo vans, a fleet of police vehicles, a fleet of taxis, or a fleet of food-service vehicles).

In certain embodiments, as further depicted by FIG. 1, the vehicle 102 may include an in-vehicle control system 104. In certain embodiments, the in-vehicle control system 104 may include an in-vehicle infotainment (IVI) system or other in-vehicle control system that may be suitable for providing entertainment and information monitoring and control features to a driver or one or more passengers of the vehicle 102. For example, in some embodiments, the in-vehicle control system 104 may include some combination of software, hardware, and middleware that may be suitable for allowing the driver or one or more passengers of the vehicle 102, for example, to stream media content (e.g., audio data, video data, image data, call log data, navigational maps, vehicle data, driver(s) profile data, weather data), enable the use of voice-based and touch-based control of various components and applications (e.g., vehicle 102 driving mode; camera angle and adjustments; mirror angle and adjustments; seating adjustments; vehicle 102 external and internal lighting adjustments; powering the vehicle 102 "ON" or "OFF", locking and unlocking the vehicle 102; windowing opening and closing; trunk, hatch, or tailgate opening and closing; requesting updates from the vehicle 102; pairing with one or more personal electronic devices of the driver or other passengers of the vehicle 102; creating and modifying one or more driver profiles; controlling and managing the settings and functionality of one or more components of the vehicle 102) on the vehicle 102, and for allowing the vehicle to send and receive over-the-air (OTA) information between the vehicle 102 and one or more external devices (e.g., between vehicle 102 and one or more remote servers, between the vehicle 102 and one or more other vehicles, between the vehicle 102 and the one or more vehicle accessories).

Figure 2A:
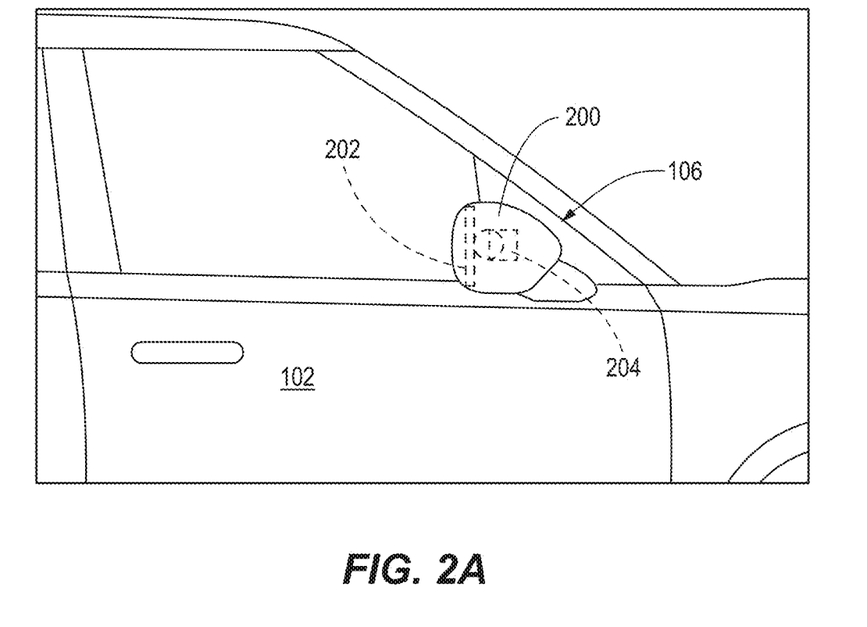
FIGS. 2A and 2B illustrates tilting of a side mirror in accordance with certain embodiments.
Figure 2B:
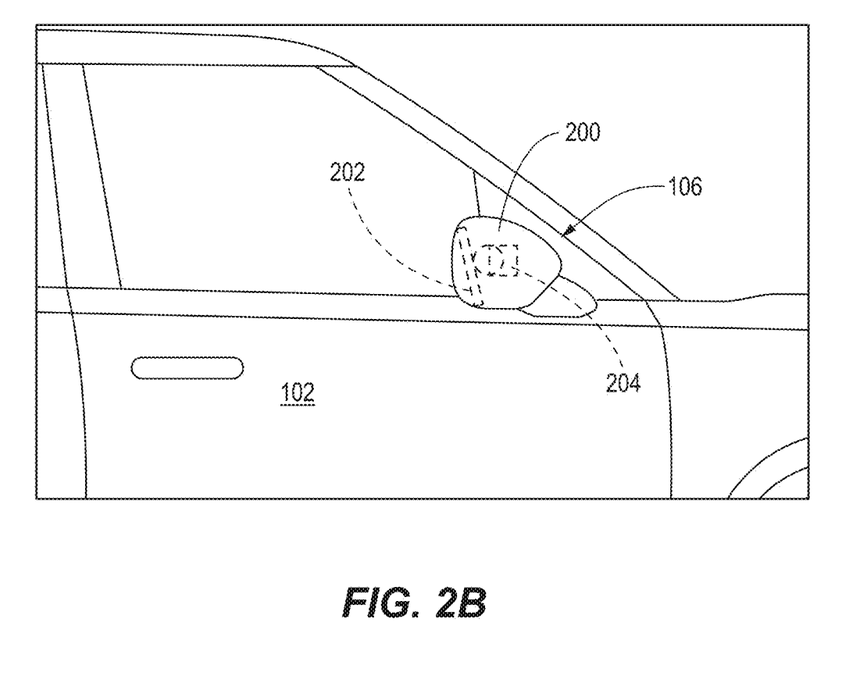

Referring to FIGS. 2A and 2B, while still referring to FIG. 1, the vehicle 102 may include side view mirror assemblies 106. The side view mirror assemblies 106 may include a housing 200 containing a mirror 202 and a mirror actuator 204. The mirror actuator 204 may have two or more degrees of rotational freedom. As discussed in greater detail below, the mirror actuator 204 may transfer the mirror 202 between a driving configuration (FIG. 2A) suitable for driving and providing a view of vehicles driving behind and to the side of the vehicle 102 and a downward tilted configuration (FIG. 2B), which provides a better view (as compared to the driving configuration) of the rear tire, curbing or other obstacles close to the ground (e.g., within 20 cm), and other portions of the vehicle around the rear tire. The downward tilted configuration may be suitable for when driving in reverse, parallel parking, or other situations requiring such visibility, such as when driving over rough terrain.

Figure 3:
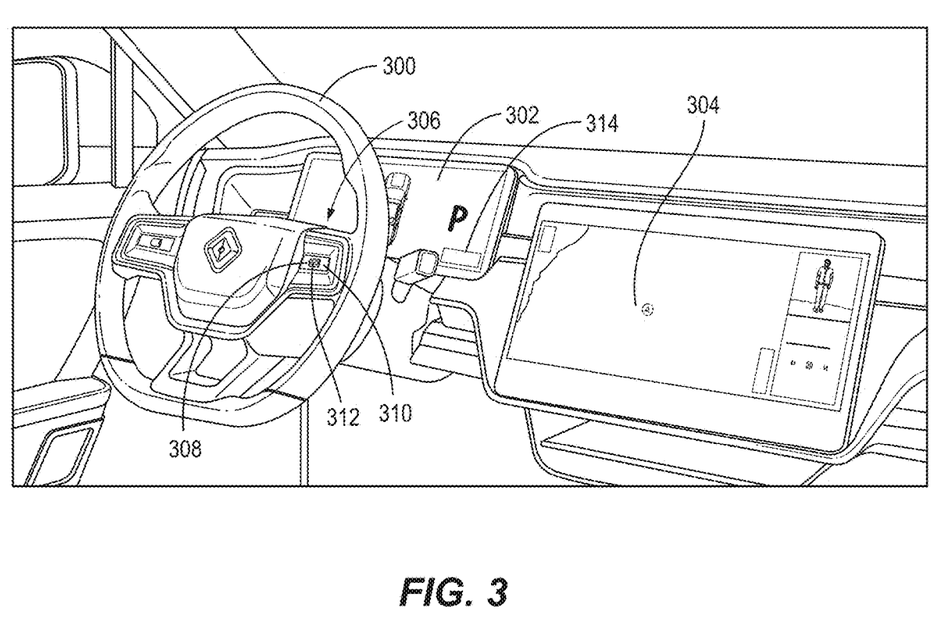
FIG. 3 illustrates physical controls and computer-generated interfaces that may be the subject of context-based mapping in accordance with certain embodiments.

Referring to FIG. 3, the interior of the vehicle 102 includes a steering wheel 300 that is turned by the user to invoke turning of the vehicle 102 by some or all of changing the angle of the front wheels, changing the angle of the rear wheels, and changing the relative speeds of wheels on the right and left sides of the vehicle. The interior of the vehicle 102 includes a dashboard, which in the illustrated embodiment includes, or is implemented as, a dashboard display device 302 coupled to the in-vehicle control system 104. The in-vehicle control system 104 may display vehicle state information (speed, state of charge, drive-train state (drive, park, reverse)), navigation information (maps, directions, etc.) or other information.

The interior of the vehicle 102 may further include an infotainment display device 304. The infotainment display device 304 may be embodied as a touch screen located to one side of the steering wheel 300. The in-vehicle control system 104 may therefore cause the infotainment display device 304 to display interfaces for controlling systems of the vehicle and receive and execute inputs received through the interfaces from a driver or passenger.

The steering wheel 300 or other portion of the vehicle 102 may include a control cluster 306 including physical interface elements that can be manipulated by the driver. In the illustrated embodiment, the control cluster 306 includes a left button 308 and a right button 310 that may be pressed by the thumb of a driver while holding the steering wheel. The control cluster 306 may include a scroll wheel 312, such as between the left button 308 and right button 310. The scroll wheel 312 may be rotated by the thumb of the driver to select between multiple options or otherwise select among a range of values (e.g., volume of a sound system). In some embodiments, the scroll wheel 312 is also a button, the depression of which may be detected and invoke associated functionality. The buttons 308, 310 may be implemented as mechanical buttons that generate an output in response to being physically depressed by the user. The buttons 308, 310 may also be implemented as capacitive buttons or other type of button that does not physically deform or deflect in response to being pressed. The scroll wheel 312 may likewise include an element that physically spins in response to force applied by a user or may be implemented a touch-sensitive element capable of detecting a direction of movement and possibly a speed of movement of a user's finger over the touch-sensitive element and possibly capable of detecting pressure applied by the user's finger.

The control cluster 306 is exemplary only. Other physical interface elements at other locations within the interior of the vehicle 102 may have context-based mappings associated therewith according to the approach described herein. In particular, the control cluster 306 on the right side of the steering wheel 300 is discussed extensively herein with the understanding that a control cluster on the left side of the steering wheel 300 may be used in a like manner.

As discussed extensively below, the functions invoked by the control cluster 306 may be varied dynamically based on context of the vehicle 102, referred to herein as a "context mapping." In some embodiments, the dashboard display device 302 includes a mapping display 314 that communicates to the driver the functions associated with the current context mapping of the control cluster 306. Note that although the functions associated with a particular context mapping are not associated with the control cluster 306, the functions may be available elsewhere, such as by navigating interfaces presented on the infotainment display device 304.

Figure 4A:
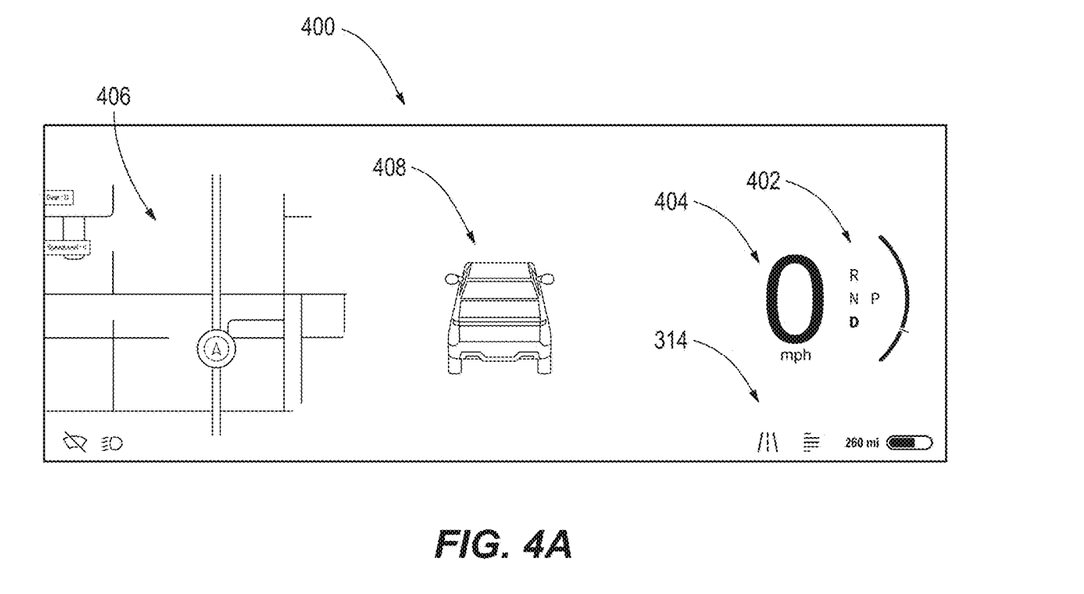
FIGS. 4A and 4B illustrates a graphical user interface for communicating a context-based mapping for mirror tilting in accordance with certain embodiments.

FIG. 4A illustrates an example interface 400 that may be displayed on the dashboard display device 302. The interface 400 may include such information as a current gear state 402 of the vehicle 102 (reverse, neutral, drive, park), a speed 404 of the vehicle 102, and navigation information 406. The interface 400 may further include a diagram 408 or other representation of a state of the vehicle 102. Other information displayed in the interface 400 may include a state of charge of a battery, amount of remaining fuel, headlight state, whether adaptive cruise control is turned, or other information regarding the state of the vehicle 102. In FIG. 4A, the mapping display 314 is blank and does not indicate a mapping for the control cluster 306. In such scenarios, the control cluster 306 may either have no function or have default functions, such as controlling a sound system, climate control system, or other system of the vehicle 102.

Figure 4B:
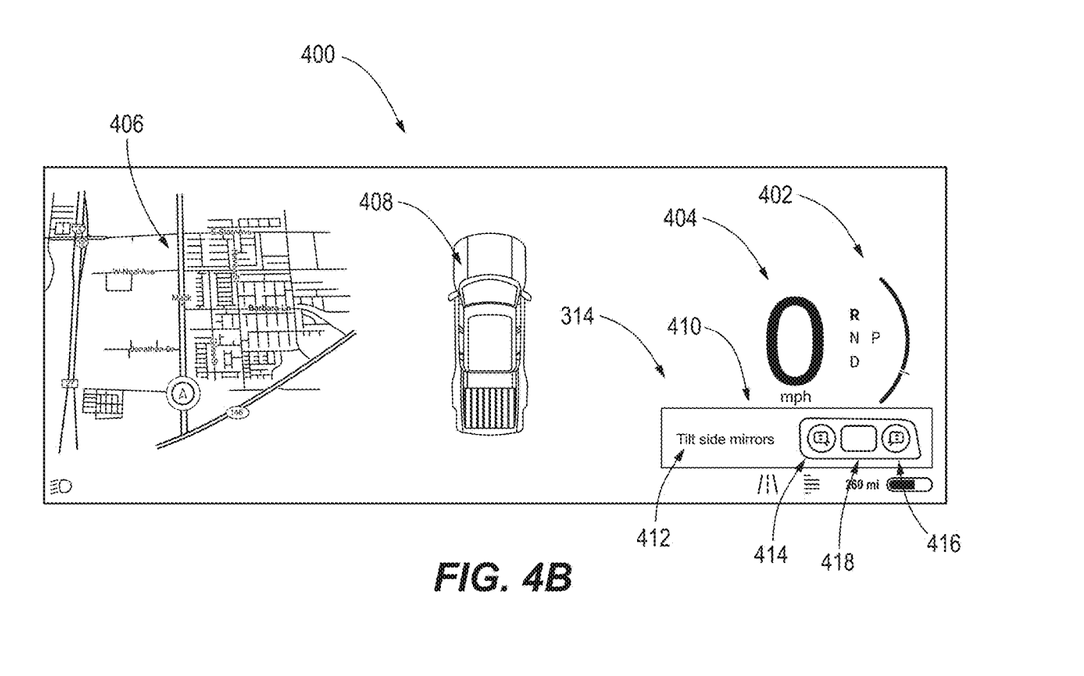

Referring to FIG. 4B, when the context of the vehicle 102 corresponds to a particular context-mapping, the interface 400 may be modified to display mapping information 410 in the mapping display 314. The mapping information 410 may include text 412 or other graphical information (e.g., an icon) indicating some or all of (a) the context of the vehicle that invoked display of the mapping (b) the functions invoked by interacting with the control cluster 306. For example, the text 412 in the illustrated example reads "side mirror tilt," indicating that interaction with the control cluster 306 will invoke tilting of one or both side mirrors 202 to or away from the downward tilted configuration as discussed above.

The mapping information 410 may include text or symbols communicating the function of some or all of the buttons 308, 310 and scroll wheel 312 of the control cluster 306. For example, symbol 414 indicates that pressing the left button 308 will tilt or untilt the left mirror 202 and symbol 416 indicates that pressing the right button 30 will tilt or untilt the right mirror 202. In the illustrated mapping information 410, no context-based mapping is associated with the scroll wheel 312 such that a region of the mapping display 314 corresponding to the scroll wheel 312 is left blank, is grayed out, or otherwise does not include a symbol or other information indicating a context-based mapping. The in-vehicle control system 104 may either (a) not associate any functionality with the scroll wheel 312 while the context-based mapping is in effect or (b) associate a default function with the scroll wheel 312. For example, in the absence of a context-based mapping for pressing of the scroll wheel 312, pressing of the scroll wheel 312 may invoke the brakes of a trailer connected to the vehicle 102.

Figure 5A:
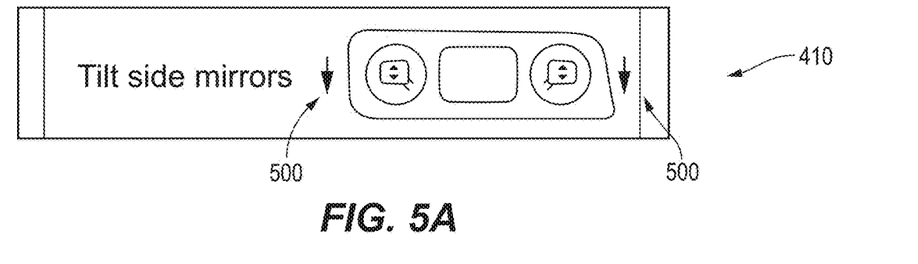
FIGS. 5A to 5E illustrate example graphical user interfaces for communicating a state of side-view mirrors and a context-based mapping for mirror tilting in accordance with certain embodiments.
Figure 5B:
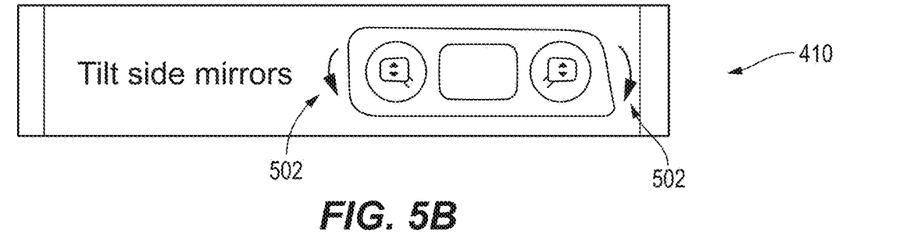
Figure 5C:
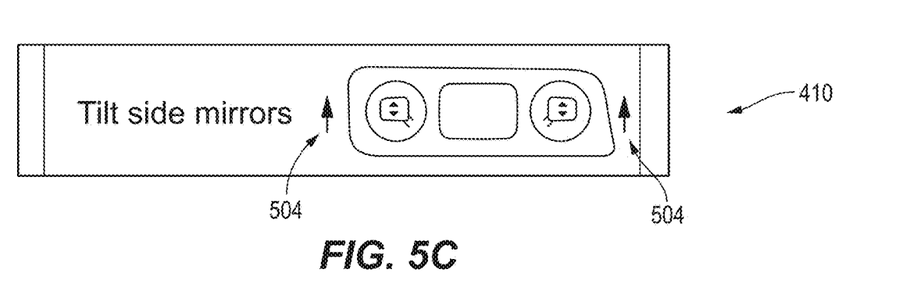
Figure 5D:
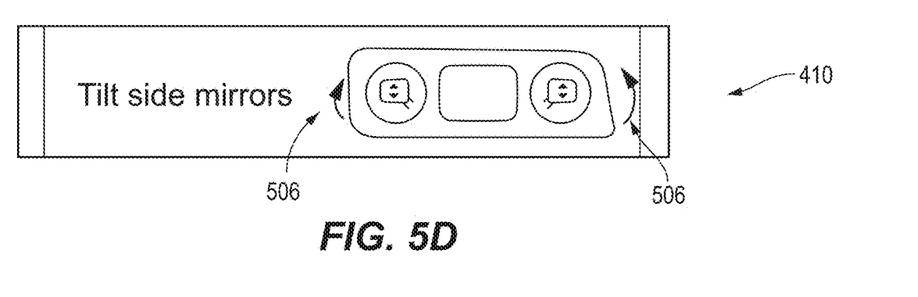
Figure 5E:
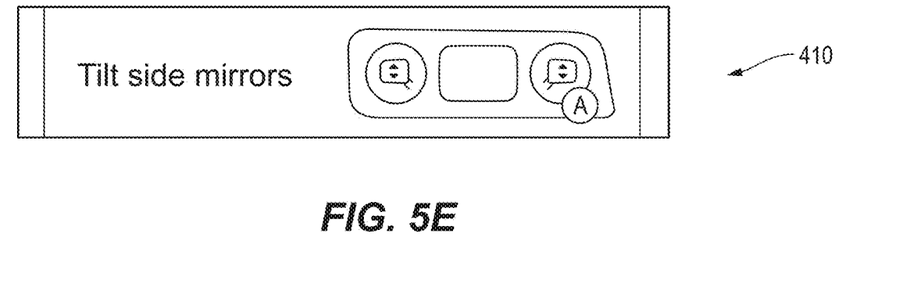

Referring to FIGS. 5A to 5E, in some embodiments, the mapping information 410 may communicate the state of a component of the vehicle 102 associated with a context-based mapping. For example, the mapping information 410 may include symbols 500 indicating that one or both mirrors 202 are in the downward tilted configuration (FIG. 5A), symbols 502 indicating one or both mirrors 202 are in the process of moving to the downward tilted configuration (FIG. 5B), symbols 504 indicating that one or both mirrors are currently in the driving configuration (FIG. 5C), or symbols 506 indicating that one or both mirrors 202 are in the process of returning to the driving configuration (FIG. 5D). The mapping information 410 may indicate whether automatic tilting of one or both mirrors 202 is enabled ("A") in addition to the current state of each mirror 202. As discussed in greater detail below, automatic tilting may include transitioning a mirror 202 to the downward tilted configuration without a user instruction to do so, such as in response to transitioning the vehicle 102 to the reverse gear state.

Figure 6:
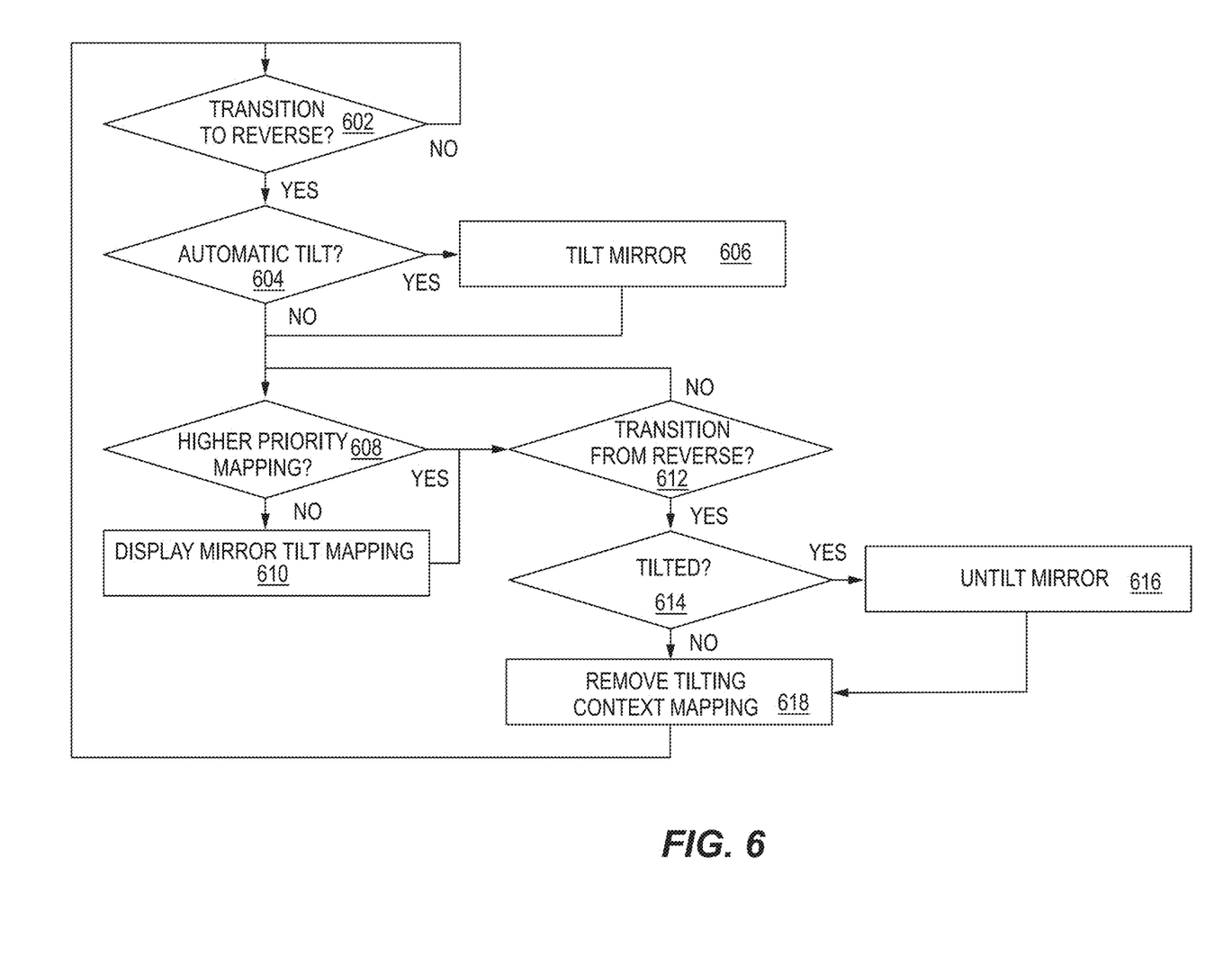
FIG. 6 is an example method for performing context-based mapping for mirror tilting in accordance with certain embodiments.

FIG. 6 illustrates an example method 600 that may be used to select a context-based mapping of the control cluster 306 for controlling tilting of the mirrors 202 ("the tilting context mapping") and responding to user interactions with the control cluster 306. The method 600 may be executed by the in-vehicle control system 104.

The method 600 includes detecting, at step 602, a transition to a reverse gear state of the vehicle 102. Transitioning to the reverse gear state is one example of a trigger for the tilting context mapping. Other triggers may also be used for scenarios that might benefit from the downward tilted configuration. For example, such scenarios may include any of the following or a combination of two or more of the following: speeds and steering wheel movements corresponding to parallel parking, location of the vehicle at or near (e.g., within one vehicle length or width) from a parallel parking spot. In another example, a sharp turn of the steering wheel 300 (e.g., change in steering angle of above 15 degrees) with the vehicle traveling at slow speed (e.g., less than 6 miles an hour) may automatically automatic the downward tilting configuration for mirror to the side the vehicle 102 is turning.

In response to detecting the transition to the reverse gear state of the vehicle 102, the method 600 includes evaluating, at step 604 whether the settings of the in-vehicle control system 104 require automatic tilting of one or both mirrors 202. If so, each mirror for which automatic tilting is required is tilted, at step 606, from the driving configuration to the downward tilted configuration.

The method 600 may include evaluating, at step 608, whether a context mapping having higher priority than the tilting context mapping has been triggered. As discussed in greater detail below with respect to FIG. 11, there are many context mappings with different triggering conditions, multiple of which may be satisfied simultaneously. The context mapping with the higher priority will therefore be selected to determine the functions associated with the control cluster 306 and the mapping information 410 that is displayed in the mapping display 314.

If no higher-priority context mapping has been triggered, then the mapping information 410 for the tilting context mapping will be displayed at step 610 in the mapping display 314 (see FIG. 4B and associated description) and the tilting context mapping is made active. While the tilting context mapping is active, user inputs to the control cluster 306 will be received and processed according to the tilting context mapping. For example, when the tilting context mapping is active:

pressing button 308 will invoke tilting of the left mirror 202 to the downward tilted configuration when the left mirror is in the driving configuration.

pressing button 308 will invoke tilting of the left mirror 202 to the driving configuration when the left mirror is in the downward tilted configuration.

pressing button 310 will invoke tilting of the right mirror 202 to the downward tilted configuration when the right mirror is in the driving configuration.

pressing button 310 will invoke tilting of the right mirror 202 to the driving configuration when the right mirror is in the downward tilted configuration.

The tilting context mapping may remain active until either (a) the vehicle 102 is found, at step 612, to transition away from the reverse gear state or (b) a higher priority mapping is found, at step 608, to be active. A transition away from the reverse gear state may be detected in response to shifting of the vehicle 102 into a drive mode other than the reverse gear state. A transition away from the reverse drive mode may be detected in response to movement of the vehicle in the forward direction above a threshold speed, e.g., 6 miles an hour or other predefined speed. For example, the downward tilted configuration may be helpful when parallel parking, which involves driving forward and backward at low speeds such that the downward tilted configuration may be helpful in both directions. Likewise, constant switching between the downward tilted configuration and the driving configuration while parallel parking would be disconcerting. Until the vehicle is found to transition away from the reverse gear state, the tilting context mapping may return to being active when any higher-priority context mapping is no longer active.

If the vehicle is found, at step 612, to transition away from the reverse mode, the method 600 may include evaluating, at step 614, whether either of the mirrors 202 is currently in the downward tilted configuration. If so, any mirror in the downward tilted configuration is untilted to the driving configuration at step 616. The method 600 may then include removing, at step 618, the tilting context mapping such that the mapping information 410 for the tilting context mapping is no longer displayed in the mapping display 314. The functions associated with the control cluster 306 may then either (a) return to default functions or (b) be set to be the functions associated with some other context mapping that is currently triggered along with displaying the mapping information 410 for the other context mapping.

Figure 7A:
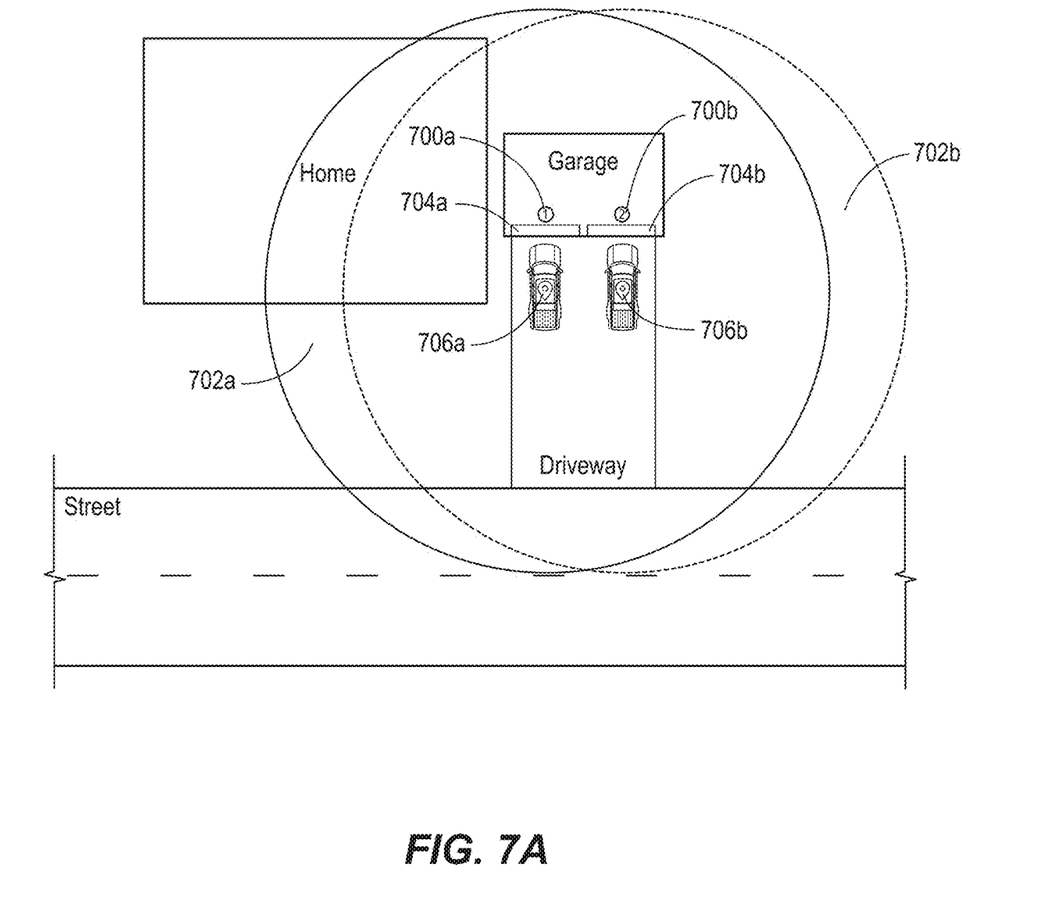
FIGS. 7A and 7B illustrate the association of regions with particular garage door openers in accordance with certain embodiments.

Referring to FIG. 7A, in some embodiments, a context mapping associates control of one or more garage door openers (GDO) 700a, 700b with the control cluster 306 ("the GDO context mapping"). For example, a user may specify a location and size of a region 702a, 702b associated with a particular GDO 700a, 700b. For example, while the vehicle 102 is located in front of or behind a garage door 704a, 704b opened by a GDO 700a, 700b, a user may specify that the current location 706a, 706b of the vehicle 102 (such as a GPS coordinate detected by a GPS receiver of the in-vehicle control system 104) is associated with that GDO 700*a*, 700*b*. The in-vehicle control system 104 may set a size of the region 702*a*, 702*b* in response to an input from a user, such as in the form of a radius of a circular region centered on the current location 706*a*, 706*b*. In this manner, the user may achieve a desired timing for the opening of a garage door 704*a*, 704*b* upon arrival. As is apparent in FIG. 7A, the regions 702*a*, 702*b* of two or more GDOs 700*a*, 700*b* may overlap one another. In other scenarios, a single region 702*a* will be defined and does not overlap another region 702*b*, as shown in FIG. 7B.

The in-vehicle control system 104 may be configured to control each GDO 700*a*, 700*b*. The manner in which the in-vehicle control system 104 pairs with each GDO 700*a*, 700*b* in order to enable such control may be performed according to any approach known in the art. In addition, the in-vehicle control system 104 may analyze data, e.g., codes, received from a particular GDO 700*a*, 700*b* in order to determine a make and/or model of the GDO 700*a*, 700*b*. The in-vehicle control system 104 may further determine a state of the GDO 700*a*, 700*b*, e.g., a state in a pairing process. In some embodiments, the in-vehicle control system 104 may be loaded with instructions, images, and other information for various makes and models of GDOs. Accordingly, the in-vehicle control system 104 may display instructions and/ or images, such as on the infotainment display device 304, during a pairing process in order to guide the user. For example, the in-vehicle control system 104 may invoke display of an image of a GDO highlighting buttons to be pushed and including text or other types of information to instruct the user how to perform pairing.

Figure 7B:
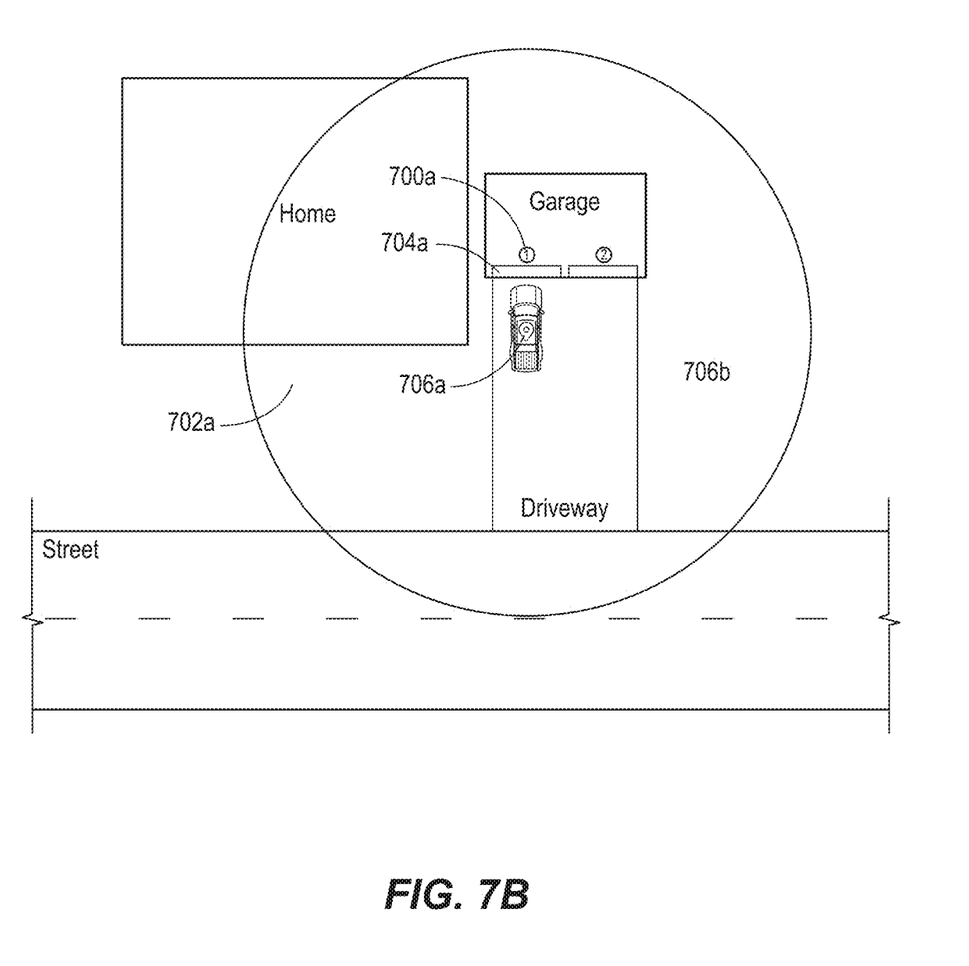
Figure 8:
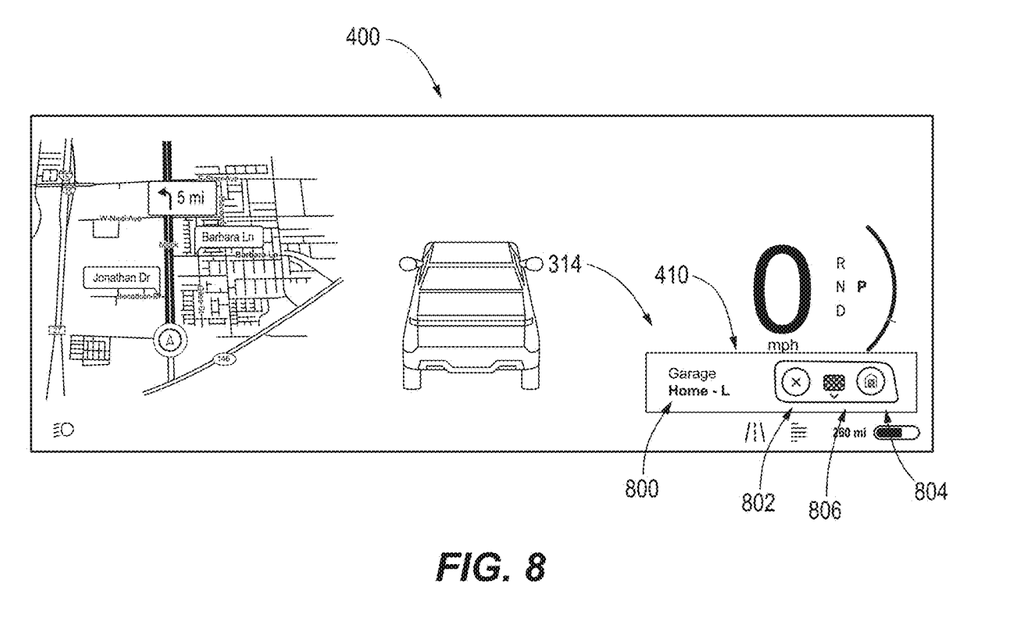
FIG. 8 illustrates an example graphical user interface for communicating a context-based mapping for garage door opening functions in accordance with certain embodiments.

Referring to FIG. 8, while still referring to FIGS. 7A and 7B, when the vehicle 102 is within a region 702*a*, 702*b* for at least one GDO 700*a*, 700*b* for which a region 702*a*, 702*b* has been configured, the GDO context mapping may become active provided that a higher-priority context mapping is not also triggered.

The mapping information 410 for the GDO context mapping may include text 800 indicating that the GDO context mapping is active ("garage"). The text 800 may indicate (a) an identifier of a single GDO 700*a*, 700*b* corresponding to the region 702*a*, 702*b* in which the vehicle 102 is located such that the GDO context mapping was triggered or (b) an identifier of a selected GDO 700*a*, 700*b* from among multiple GDOs 700*a*, 700*b* for which the vehicle 102 is located in a corresponding regions 702*a*, 702*b*. For example, "Home-L" in the illustrated example where region 702*a* corresponds to a left garage door 704*a* and overlapping region 702*b* corresponds to a right garage door 704*b* ("Home-R").

The mapping information 410 may include a symbol 802 or other indicator that indicates that button 308, when pressed, will invoke exiting of the GDO context mapping. The mapping information 410 may include a symbol 804 or other indicator that indicates that button 310, when pressed, will invoke opening (if currently closed) or closing (if currently opened) of a single GDO 700*a*, 700*b* having the vehicle 102 located in the region 702*a*, 702*b* or the selected GDO 700*a*, 700*b* of multiple GDOs 700*a*, 700*b* having the vehicle 102 in the regions 702*a*, 702*b* thereof.

Where the vehicle 102 is in the regions 702*a*, 702*b* of multiple GDOs 700*a*, 700*b*, the mapping information 410 may include a symbol 806 (e.g., a down or up arrow) indicating that scrolling of the scroll wheel 312 will invoke selection of a different GDO 700*a*, 700*b* than is currently selected to be controlled by pressing of the button 310.

In the absence of user interaction with the scroll wheel 312, the selected GDO 700*a*, 700*b* may be whichever of the GDOs 700*a*, 700*b* was used last, a default GDO 700*a*, 700*b* specified explicitly by the user, or a GDO 700*a*, 700*b* selected based on some other criteria. For example, an image from a forward-facing camera of the vehicle 102 may be used to identify the exact garage door 704*a*, 704*b* in front of which the vehicle 102 is located and the GDO 700*a*, 700*b* for that garage door 704*a*, 704*b* may then be selected. For example, one or more reference images may be captured with one or more cameras of the vehicle 102 when a region 702*a*, 702*b* is defined for a GDO 700*a*, 700*b*. During use, one or more test images from the one or more cameras may be compared to the reference images for one or more GDOs 700*a*, 700*b*. The one or more reference images most similar to one or more test images may be identified and the GDO 700*a*, 700*b* corresponding to the most similar one or more reference images will be selected as the selected GDO 700*a*, 700*b*.

Figure 9:
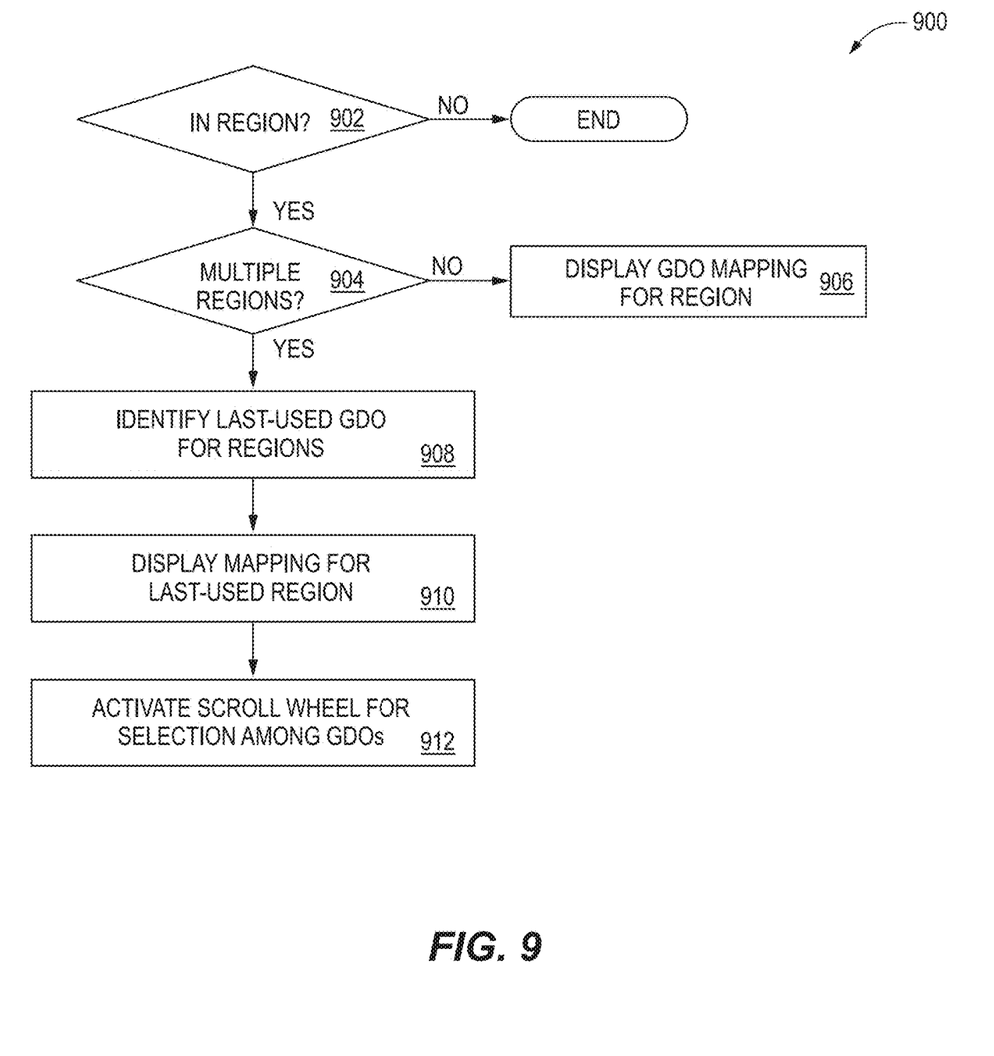
FIG. 9 illustrates an example method for providing a context-based mapping for garage door opening functions in accordance with certain embodiments.

Referring to FIG. 9, a method 900 may be executed by the in-vehicle control system 104. The method 900 may include evaluating, at step 902, whether the vehicle 102 is in at least one region 702*a*, 702*b* defined for at least one GDO 700*a*, 700*b*. If not, the method 900 may end. Likewise, if a context mapping having higher priority than the GDO context mapping is currently active, the method 900 may end regardless of whether the vehicle 102 is in at least one region 702*a*, 702*b* defined for at least one GDO 700*a*, 700*b*. If the vehicle 102 is an at least one region 702*a*, 702*b* and a higher priority context mapping is not triggered, the GDO context mapping may become active. The GDO context mapping becoming active may be accompanied by an audible chime.

If the vehicle 102 is not found, at step 904, to be in multiple regions 702*a*, 702*b*, the method 900 may include displaying, at step 906, the mapping information 410 for the GDO context mapping and the GDO 700*a*, 700*b* corresponding to the region 702*a*, 702*b* in which the vehicle 102 is located as described above with respect to FIG. 8.

If the vehicle 102 is found, at step 904, to be in multiple regions 702*a*, 702*b*, the method 900 may include identifying, at step 908, a last-used GDO 700*a*, 700*b* of the GDOs 700*a*, 700*b* for which the multiple regions 702*a*, 702*b* are defined. At step 910, the mapping information 410 for the last-used GDO 700*a*, 700*b* is displayed, as described above with respect to FIG. 8. As noted above, other criterial may be used at step 908 to select the selected GDO 700*a*, 700*b*. In addition, the mapping information 410 displayed at step 910 may include the indicator 418 indicating that the user has the option of selecting among the multiple GDOs 700*a*, 700*b* for which the multiple regions 702*a*, 702*b* are defined. The method 900 may further include activating, at step 912, the scroll wheel 312 such that interaction with the scroll wheel 312 will invoke switching to a different GDO 700*a*, 700*b* that will then be controlled by interaction with the button 310.

The above-described example relates to a vehicle 102 arriving within one or more regions 702*a*, 702*b*. The vehicle 102 leaving one or more regions 702*a*, 702*b* may likewise trigger the GDO context mapping. The method 900 will therefore function as described above except the departure from one or more regions 702*a*, 702*b* will satisfy the condition of step 902 and whether the vehicle has simultaneously (e.g., within 1 second) departed multiple regions 702*a*, 702*b* may be evaluated at step 904.

Figure 10:
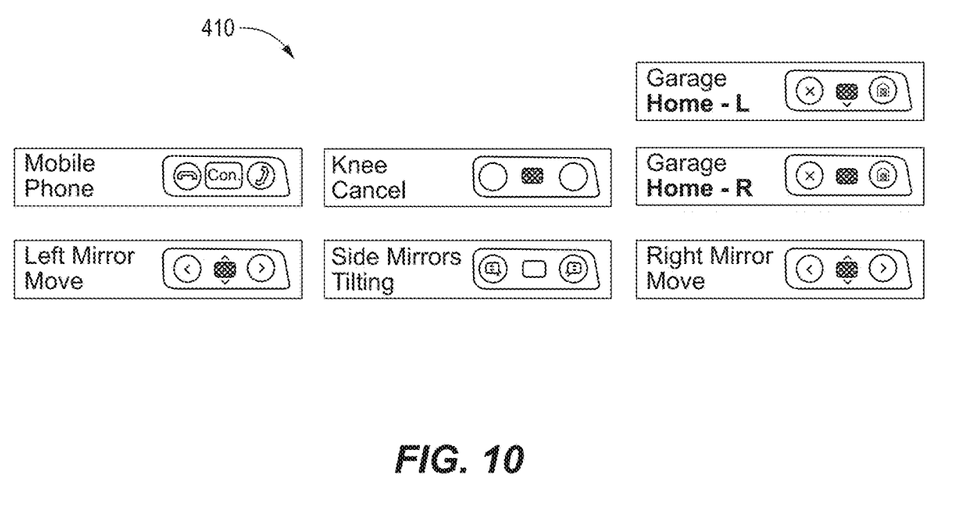
FIG. 10 illustrates a plurality of context-based mappings in accordance with certain embodiments.

Referring to FIG. 10, the tilting context mapping and GDO context mapping as described above are only examples of context mappings that may be used to select the functions performed by the control cluster 306. FIG. 10 illustrates examples of mapping information 410 and corresponding functions that may be associated with different contexts.

For example, the mapping information 410 labeled "Mobile Phone" may correspond to a "mobile phone context mapping" in which button 308 invokes ending of a call, button 310 invokes answering or making a call, and in which scroll wheel 312 may be used to scroll through contacts, or some other set of values. The mobile phone context mapping may be triggered by detecting a phone call received or sent from a mobile phone connected to a BLUETOOTH transceiver or other interface of the vehicle 102.

The mapping information 410 labeled "Kneel" may correspond to a "kneeling context mapping" in which scroll wheel 312 may be used to cancel or control kneeling (lowering of the vehicle 102 to its lowest ride height) in response to a trigger for the kneeling context mapping, e.g., when the vehicle 102 is placed in park.

The mapping information 410 labeled "Left Mirror" and "Right Mirror" may correspond to a "mirror adjustment context mapping" in which button 308 invokes rotating of a mirror 202 to the left, button 310 invokes rotating of a mirror 202 to the right, and the scroll wheel 312 invokes rotation of the mirror 202 up or down according to a direction of rotation of the scroll wheel 312. The mirror adjustment context mapping, and the selection of which of the right or left mirror is adjusted, may be triggered by another input from a user, such as a voice command or selection of an interface element using the infotainment display device 304.

Figure 11:
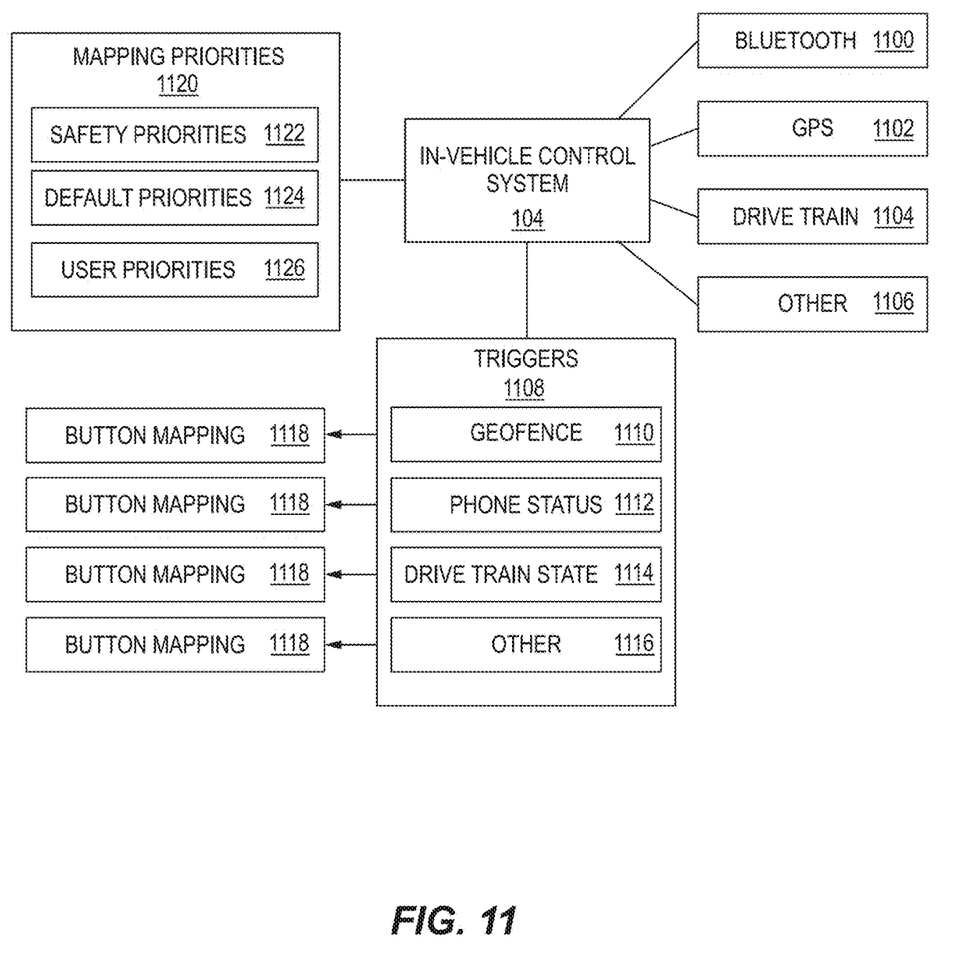
FIG. 11 illustrates components for providing context-based mappings by a in-vehicle control system.

FIG. 11 illustrates components and data structures that may be used by the in-vehicle control system 104 to detect triggering of a context mapping and select among multiple context mappings that are triggered. For example, the in-vehicle control system may be coupled to components of the vehicle 102 such as a BLUETOOTH transceiver 1100, GPS receiver 1102, a drive train 1104 of the vehicle 102, or other systems 1106 of the vehicle 102. The in-vehicle control system 104 may use information received from the components to determine whether a context mapping is triggered.

The in-vehicle control system 104 may further be configured with context mapping triggers 1108. The context mapping triggers 1108 define conditions required to be met to trigger a particular context mapping. For example, a context mapping trigger 1108 may include a geofence 1110, e.g., a region such that a context mapping trigger is invoked when the vehicle is located within the region as determined from the output of the GPS receiver 1102, such as according to the approach described above with respect to FIGS. 7A, 7B, 8, and 9.

A context mapping trigger 1108 may include a detected status 1112 of a mobile phone or other device connected to the in-vehicle control system 104, such as using the BLUETOOTH transceiver 1100. The status 1112 may include pairing of the device, receiving a call, making of a call, or other action performed using the mobile phone.

A context mapping trigger 1108 may include a detected state 1114 of the drive train 1104 of the vehicle 102, such as entering a particular gear state, entering a particular drive mode (all-purpose, conserve, sport, off-road, etc.), driving above or below a particular speed. For example, as described above, placing the vehicle 102 in reverse may invoke the tilting context mapping.

The context mapping trigger 1108 may include other triggers 1116 conditioned on the state of any other system of the vehicle 102 or a value detected by any of the sensors of the vehicle 102.

Each of the context mapping trigger 1108 has a corresponding button mapping 1118. The button mapping 1118 may define one or both of (a) the functionality associated with the buttons 308, 310 and scroll wheel 312 of the control cluster 306 and (b) the mapping information 410 to be displayed in the mapping display 314 when the context mapping associated with a particular context mapping trigger 1108 is active.

The in-vehicle control system 104 may further be configured with priorities 1120 used to select which of multiple simultaneously triggered context mappings to make active. As used herein "simultaneously triggered" may be understood as meaning the conditions for triggering the multiple context mappings are all currently satisfied regardless of when the conditions began to be satisfied.

The priorities 1120 may include safety priorities 1122. Safety priorities 1122 may be defined to promote safety and may preempt any other priority. Accordingly, a context mapping having a safety priority 1122 may be made active despite a context mapping without a safety priority 1122, or a lower safety priority, also being simultaneously triggered.

The priorities 1120 may include default priorities 1124. Default priorities 1124 may be defined by a designer of the vehicle 102 to promote convenience of the user and to avoid confusion. Accordingly, a context mapping having a default priority 1124 may be made active despite a context mapping with a lower default priority 1124 also being simultaneously triggered.

The priorities 1120 may include user priorities 1126. User priorities 1126 may be selected by a user of the vehicle 102 based on the user's preferences. Accordingly, a context mapping having a user priority 1126 may be made active despite a context mapping with a lower user priority 1126 or any default priority 1124 also being simultaneously triggered.

Priorities 1120 are one example of logic for selecting among simultaneously triggered context mappings. Other logic may also be used, which may be specific to the context mappings themselves. For example, triggering of the tilting context mapping in response to user driving inputs that might indicate parallel parking may be ignored in favor of the GDO context mapping when the vehicle 102 is located within one or more regions 702a, 702b defined for one or more GDOs 700a, 700b.

In another example, in first vehicle states, e.g., high vehicle speeds, safety considerations may demand that a context mapping be given higher priority whereas in second vehicle states, e.g., lower vehicle speeds, the priority of the context mapping is lowered such that some other context mapping may have higher priority.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A system comprising:
a vehicle comprising a plurality of vehicle systems;
one or more physical controls mounted within the vehicle and configured to be manipulated by a user of the vehicle; and
an in-vehicle control system coupled to the plurality of vehicle systems, the in-vehicle control system configured to:
detect a state of one or more of the plurality of vehicle systems;
determine that a trigger for a context mapping is met by the state; and
in response to determining that the trigger for the context mapping is met by the state, associating functions defined for the one or more physical controls by the context mapping with the one or more physical controls.

2. The system of claim 1, further comprising a display device mounted in the vehicle, the in-vehicle control system further configured to display, on the display device, mapping information communicating the functions defined for the one or more physical controls by the context mapping.

3. The system of claim 1, wherein:
the trigger is a first trigger and the context mapping is a first context mapping; and
the in-vehicle control system is further configured to:
determine that a second trigger for a second context mapping is met by the state;
evaluating a first priority associated with the first context mapping relative to a second priority associated with the second context mapping;
(a) determining that the first priority is greater than the second priority; and
in response to (a), associating functions defined for the one or more physical controls by the first context mapping.

4. The system of claim 1, wherein the one or more physical controls include a scroll wheel.

5. The system of claim 1, wherein the one or more physical controls include a scroll wheel and buttons positioned on either side of the scroll wheel.

6. The system of claim 1, wherein the one or more physical controls are mounted to a steering wheel of the vehicle.

7. The system of claim 1, wherein the context mapping causes the one or more physical controls to control tilting of mirrors.

8. The system of claim 7, wherein the trigger is the vehicle being place in a reverse drive train state.

9. The system of claim 7, wherein the trigger is detecting the vehicle performing parallel parking.

10. The system of claim 1, wherein the context mapping causes the one or more physical controls to control a ride height of the vehicle.

11. The system of claim 10, wherein the trigger is the vehicle being placed in a parked drive train state.

12. The system of claim 1, wherein the context mapping causes the one or more physical controls to control transmission of a signal controlling a garage door opener.

13. The system of claim 12, wherein the trigger is detecting that the vehicle is within a geofence associated with the garage door opener.

14. The system of claim 1, wherein the context mapping causes the one or more physical controls to control selection from among multiple garage door openers.

15. The system of claim 14, wherein the trigger is detecting that the vehicle is within multiple geofences associated with the multiple garage door openers.

16. The system of claim 1, wherein the context mapping causes the one or more physical controls to control operation of a mobile phone connected to the in-vehicle control system.

17. The system of claim 16, wherein the trigger is detection of receiving of a phone call.

18. A method for operating a vehicle comprising:
- detecting, by a control system, a state of one or more a plurality of vehicle systems;
- determining, by the control system, that a trigger for a context mapping is met by the state; and
- in response to determining that the trigger for the context mapping is met by the state, associating, by the control system, functions defined for one or more physical controls by the context mapping with the one or more physical controls.

19. The method of claim 18, further comprising displaying, by the control system, on a display device in the vehicle, mapping information communicating the functions defined for the one or more physical controls by the context mapping.

20. The method of claim 18, wherein the one or more physical controls are mounted to a steering wheel of the vehicle.

* * * * *